United States Patent
Tonar et al.

(10) Patent No.: US 6,816,297 B1
(45) Date of Patent: Nov. 9, 2004

(54) ELECTROCHROMIC MIRROR HAVING A SELF-CLEANING HYDROPHILIC COATING

(75) Inventors: William L. Tonar, Holland, MI (US); John S. Anderson, Holland, MI (US); David J. Cammenga, Zeeland, MI (US)

(73) Assignee: Gentex Corporation, Zeeland, MI (US)

( * ) Notice: Subject to any disclaimer, the term of this patent is extended or adjusted under 35 U.S.C. 154(b) by 64 days.

(21) Appl. No.: 09/602,919

(22) Filed: Jun. 23, 2000

Related U.S. Application Data

(60) Provisional application No. 60/141,080, filed on Jun. 25, 1999.

(51) Int. Cl.[7] ............................. G02F 1/15; G02F 1/153; G02B 5/08
(52) U.S. Cl. ....................... 359/265; 359/267; 359/269; 359/274; 359/507
(58) Field of Search ................................. 359/265, 267, 359/269, 272, 273, 274, 275, 507, 512

(56) References Cited

U.S. PATENT DOCUMENTS

| | | | |
|---|---|---|---|
| 4,139,274 A | * | 2/1979 | Yamashita et al. |
| 4,293,901 A | | 10/1981 | Hernandez |
| 4,306,774 A | * | 12/1981 | Nicholson |
| 4,375,318 A | | 3/1983 | Giglia et al. |
| 4,832,467 A | * | 5/1989 | Miyagi et al. |
| 4,893,908 A | * | 1/1990 | Wolf et al. |
| 5,076,673 A | * | 12/1991 | Lynam et al. |
| 5,122,896 A | * | 6/1992 | Mizusaki et al. |
| 5,216,536 A | | 6/1993 | Agrawal et al. |
| 5,523,877 A | * | 6/1996 | Lynam |
| 5,594,585 A | | 1/1997 | Komatsu |
| 5,688,855 A | | 11/1997 | Stoy et al. |
| 5,854,708 A | * | 12/1998 | Komatsu et al. |
| 5,923,457 A | * | 7/1999 | Byker et al. |
| 5,940,201 A | * | 8/1999 | Ash et al. |
| 6,013,372 A | | 1/2000 | Hayakawa et al. |
| 6,020,987 A | * | 2/2000 | Baumann et al. |
| 6,071,606 A | | 6/2000 | Yamazaki et al. |
| 6,071,623 A | | 6/2000 | Sugawara et al. |
| 6,103,363 A | | 8/2000 | Boire et al. |
| 6,193,378 B1 | * | 2/2001 | Tonar et al. |
| 6,447,123 B2 | * | 9/2002 | Tonar et al. |

FOREIGN PATENT DOCUMENTS

| | | |
|---|---|---|
| EP | 0 816 466 A1 | 1/1998 |
| EP | 0 820 967 A1 | 1/1998 |
| EP | 1 003 067 A2 | 5/2000 |
| JP | 63-5301 | 1/1988 |
| JP | 63-100042 | 5/1988 |

* cited by examiner

Primary Examiner—Ricky D. Shafer
(74) Attorney, Agent, or Firm—King & Jovanovic, PLC

(57) ABSTRACT

An electro-optic device is disclosed having a self-cleaning, hydrophilic optical coating. The electro-optic device preferably forms an external rearview mirror for a vehicle. The optical coating preferably includes photocatalytic layer(s), a hydrophilic layer, and a color suppression coating. The electro-optic device is preferably an electrochromic mirror. The disclosed optical coating exhibits a reflectance at the front surface of the reflective element that is less than about 20 percent, and has sufficient hydrophilic properties such that water droplets on a front surface of the optical coating exhibit a contact angle of less than about 20°. The mirror exhibits a C* value of less than 25.

7 Claims, 3 Drawing Sheets

ELECTROCHROMIC MIRROR HAVING A SELF-CLEANING HYDROPHILIC COATING

CROSS-REFERENCE TO RELATED APPLICATIONS

This application claims priority under 35 U.S.C. §119(e) on U.S. Provisional Patent Application No. 60/141,080, entitled "AN ELECTROCHROMIC DEVICE HAVING A SELF-CLEANING HYDROPHILIC COATING," and filed on Jun. 25, 1999, the entire disclosure of which is incorporated herein by reference.

This application is also related to U.S. patent application Ser. No. 09/435,266, entitled "AN ELECTROCHROMIC DEVICE HAVING A SELF-CLEANING HYDROPHILIC COATING," and filed on Nov. 5, 1999, now U.S. Pat. No. 6,193,378, the entire disclosure of which is incorporated herein by reference.

BACKGROUND OF THE INVENTION

The present invention generally relates to electro-optic devices, and more specifically relates to rearview mirrors of a vehicle.

To enable water droplets and mist to be readily removed from the windows of a vehicle, the windows are typically coated with a hydrophobic material that causes the water droplets to bead up on the outer surface of the window. These water beads are then either swept away by windshield wipers or are blown off the window as the vehicle moves.

It is equally desirable to clear external rearview mirrors of water. However, if a hydrophobic coating is applied to the external mirrors, the water beads formed on their surfaces cannot be effectively blown off since such mirrors are relatively shielded from direct airflow resulting from vehicle movement. Thus, water droplets or beads that are allowed to form on the surface of the mirrors remain on the mirror until they evaporate or grow in size until they fall from their own weight. These water droplets act as small lenses and distort the image reflected to the driver. Further, when the water droplets evaporate, water spots are left on the mirror, which are nearly as distracting as the water droplets that left the spots. In fog or high humidity, mist forms on the surfaces of the external mirrors. Such a mist can be so dense that it effectively renders the mirrors virtually unusable.

In an attempt to overcome the above-noted problems, mirror manufacturers have provided a hydrophilic coating on the outer surface of the external mirrors. See U.S. Pat. No. 5,594,585. One such hydrophilic coating includes a single layer of silicon dioxide ($SiO_2$). The $SiO_2$ layer is relatively porous. Water on the mirror is absorbed uniformly across the surface of the mirror into the pores of the $SiO_2$ layer and subsequently evaporates leaving no water spots. One problem with such single layer coatings of $SiO_2$ is that oil, grease, and other contaminants can also fill the pores of the $SiO_2$ layer. Many such contaminants, particularly hydrocarbons like oil and grease, do not readily evaporate and hence clog the pores of the $SiO_2$ layer. When the pores of the $SiO_2$ layer become clogged with car wax, oil, and grease, the mirror surface becomes hydrophobic and hence the water on the mirror tends to bead leading to the problems noted above.

A solution to the above problem pertaining to hydrophilic layers is to form the coating of a relatively thick layer (e.g., about 1000–3000 Å or more) of titanium dioxide ($TiO_2$). See European Patent Application Publication No. EPO 816 466 A1. This coating exhibits photocatalytic properties when exposed to ultraviolet (UV) radiation. More specifically, the coating absorbs UV photons and, in the presence of water, generates highly reactive hydroxyl radicals that tend to oxidize organic materials that have collected in its pores or on its surface. Consequently, hydrocarbons, such as oil and grease, that have collected on the mirror are converted to carbon dioxide ($CO_2$) and hence are eventually removed from the mirror whenever UV radiation impinges upon the mirror surface. This particular coating is thus a self-cleaning hydrophilic coating.

One measure of the hydrophilicity of a particular coating is to measure the contact angle that the sides of a water drop form with the surface of the coating. An acceptable level of hydrophilicity is present in a mirror when the contact angle is less than about 30°, and more preferably, the hydrophilicity is less than about 20°, and most preferably is less than about 10°. The above self-cleaning hydrophilic coating exhibits contact angles that decrease when exposed to UV radiation as a result of the self-cleaning action and the hydrophilic effect of the coating. The hydrophilic effect of this coating, however, tends to reverse over time when the mirror is not exposed to UV radiation.

The above self-cleaning hydrophilic coating can be improved by providing a film of about 150 to 1000 Å of $SiO_2$ on top of the relatively thick $TiO_2$ layer. See U.S. Pat. No. 5,854,708. This seems to enhance the self-cleaning nature of the $TiO_2$ layer by reducing the dosage of UV radiation required and by maintaining the hydrophilic effect of the mirror over a longer period of time after the mirror is no longer exposed to UV radiation.

While the above hydrophilic coatings work well on conventional rearview mirrors having a chrome or silver layer on the rear surface of a glass substrate, they have not been considered for use on variable reflectance mirrors, such as electrochromic mirrors, for several reasons. A first reason is that many of the above-noted hydrophilic coatings introduce colored double images and increase the low-end reflectivity of the variable reflectance mirror. For example, commercially available, outside electrochromic mirrors exist that have a low-end reflectivity of about 10 percent and a high-end reflectivity of about 50 to 65 percent. By providing a hydrophilic coating including a material such as $TiO_2$, which has a high index of refraction, on a glass surface of the mirror, a significant amount of the incident light is reflected at the glass/$TiO_2$ layer interface regardless of the variable reflectivity level of the mirror. Thus, the low-end reflectivity would be increased accordingly. Such a higher low-end reflectivity obviously significantly reduces the range of variable reflectance the mirror exhibits and thus reduces the effectiveness of the mirror in reducing annoying glare from the headlights of rearward vehicles.

Another reason that the prior hydrophilic coatings have not been considered for use on many electro-optic elements even in applications where a higher low-end reflectance may be acceptable or even desirable is that they impart significant coloration problems. Coatings such as those having a 1000 Å layer of $TiO_2$ covered with a 150 Å layer of $SiO_2$, exhibit a very purple hue. When used in a conventional mirror having chrome or silver applied to the rear surface of a glass element, such coloration is effectively reduced by the highly reflective chrome or silver layer, since the color neutral reflections from the highly reflective layer overwhelm the coloration of the lower reflectivity, hydrophilic coating layer. However, if used on an electrochromic element, such a hydrophilic coating would impart a very objectionable coloration, which is made worse by other components in the electrochromic element that can also introduce color.

Another reason that prior art coatings have not been considered for use on many electro-optic elements is haze. This haze is particularly evident in hydrophilic coatings comprising dispersed $TiO_2$ particles in a binding media such as $SiO_2$. Titanium dioxide particles have a high refractive index and are very effective at scattering light. The amount of light scattered by such a first surface hydrophilic coating is small relative to the total light reflected in a conventional mirror. In an electro-optic mirror in the low reflectance state, however, most of the light is reflected off of the first surface and the ratio of scattered light to total reflected light is much higher, creating a foggy or unclear reflected image.

Due to the problems associated with providing a hydrophilic coating made of $TiO_2$ on an electrochromic mirror, manufacturers of such mirrors have opted to not use such hydrophilic coatings. As a result, electrochromic mirrors suffer from the above-noted adverse consequences caused by water drops and mist.

SUMMARY OF THE INVENTION

Accordingly, it is an aspect of the present invention to solve the above problems by providing a hydrophilic coating suitable for use on an electro-optic device, particularly for an electrochromic mirror. To achieve these and other aspects and advantages, a rearview mirror according to the present invention comprises a variable reflectance mirror element having a reflectivity that may be varied in response to an applied voltage so as to exhibit at least a high reflectance state and low reflectance state, and a hydrophilic optical coating applied to a front surface of the mirror element. The rearview mirror preferably exhibits a reflectance of less than 20 percent in said low reflectance state, and also preferably exhibits a C* value less than about 25 in both said high and low reflectance states so as to exhibit substantial color neutrality and is substantially haze free in both high and low reflectance states.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
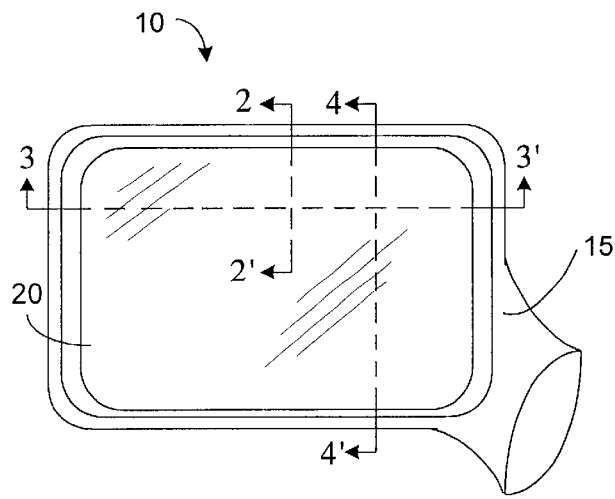
FIG. 1 is a front perspective view of an external rearview mirror assembly constructed in accordance with the present invention.

Reference will now be made in detail to the present preferred embodiments of the invention, examples of which are illustrated in the accompanying drawings. Wherever possible, the same reference numerals will be used throughout the drawings to refer to the same or like parts.

FIG. 1 shows an external rearview mirror assembly 10 constructed in accordance with the present invention. As shown, mirror assembly 10 generally includes a housing 15 and a 20 mirror 20 movably mounted in housing 15. Housing 15 may have any conventional structure suitably adapted for mounting assembly 10 to the exterior of a vehicle.

Figure 2:
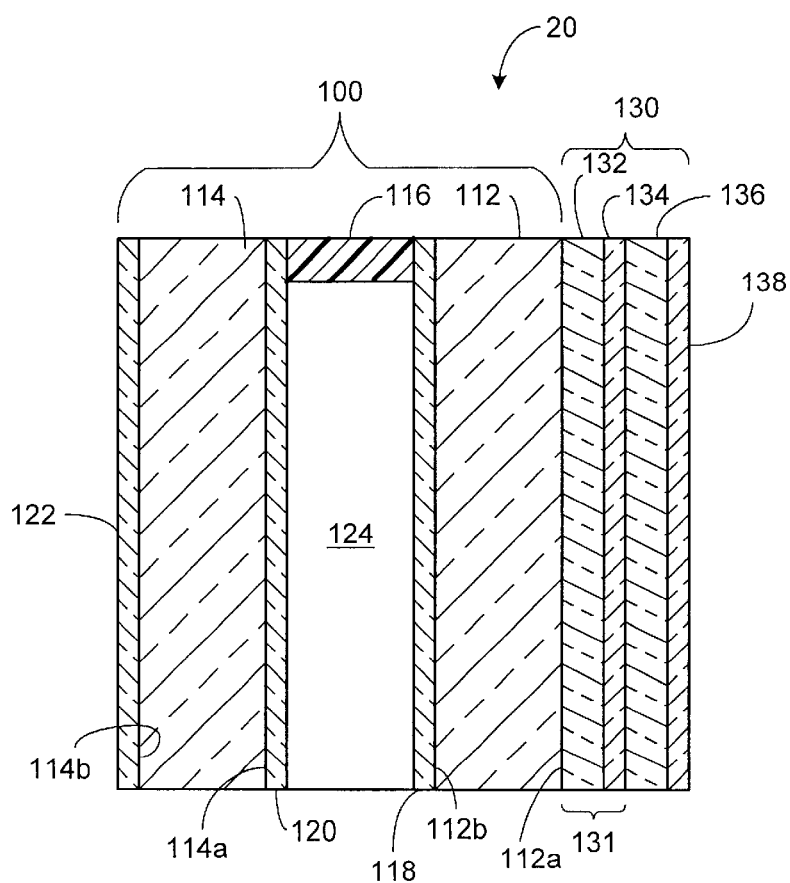
FIG. 2 is a cross section of a first embodiment of the external rearview mirror assembly shown in FIG. 1 along line 2–2'.

FIG. 2 shows an exemplary construction of a first embodiment of mirror 20. As broadly described herein, mirror 20 includes a reflective element 100 having a reflectivity that may be varied in response to an applied voltage and an optical coating 130 applied to a front surface 112a of reflective element 100. Reflective element 100 preferably includes a first (or front) element 112 and a second (or rear) element 114 sealably bonded in spaced-apart relation to define a chamber. Front element 112 has a front surface 112a and a rear surface 112b, and rear element 114 has a front surface 114a and a rear surface 114b. For purposes of further reference, front surface 112a of front element 112 shall be referred to as the first surface, rear surface 112b of front element 112 shall be referred to as the second surface, front surface 114a of rear element 114 shall be referred to as the third surface, and rear surface 114b of rear element 114 shall be referred to as the fourth surface of reflective element 100. Preferably, both elements 112 and 114 are transparent and are sealably bonded by means of a seal member 116.

Reflective element 100 also includes a transparent first electrode 118 carried on one of second surface 112b and third surface 114a, and a second electrode 120 carried on one of second surface 112b and third surface 114a. First electrode 118 may have one or more layers and may function as a color suppression coating. Second electrode 120 may be reflective or transflective, or a separate reflector 122 may be provided on fourth surface 114b of mirror 100 in which case electrode 120 would be transparent. Preferably, however, second electrode 120 is reflective or transflective and the layer referenced by numeral 122 is an opaque layer or omitted entirely. Reflective element 100 also preferably includes an electrochromic medium 124 contained in the chamber in electrical contact with first and second electrodes 118 and 120.

Electrochromic medium 124 includes electrochromic anodic and cathodic materials that can be grouped into the following categories:

(i) Single layer—the electrochromic medium is a single layer of material which may include small nonhomogeneous regions and includes solution-phase devices where a material is contained in solution in the ionically conducting electrolyte and remains in solution in the electrolyte when electrochemically oxidized or reduced. Solution-phase electroactive materials may be contained in the continuous solution phase of a cross-linked polymer matrix in accordance with the teachings of U.S. Pat. No. 5,928,572, entitled "IMPROVED ELECTROCHROMIC LAYER AND DEVICES COMPRISING SAME" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES."

At least three electroactive materials, at least two of which are electrochromic, can be combined to give a pre-selected color as described in U.S. Pat. No. 6,020,987 entitled "ELECTROCHROMIC MEDIUM CAPABLE OF PRODUCING A PRE-SELECTED COLOR."

The anodic and cathodic materials can be combined or linked by a bridging unit as described in International Application No. PCT/WO97/EP498 entitled "ELECTROCHROMIC SYSTEM." It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES."

Also included is a medium where one or more materials in the medium undergoes a change in phase during the operation of the device, for example, a deposition system where a material contained in solution in the ionically conducting electrolyte, which forms a layer or partial layer on the electronically conducting electrode when electrochemically oxidized or reduced.

(ii) Multilayer—the medium is made up in layers and includes at least one material attached directly to an electronically conducting electrode or confined in close proximity thereto, which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

Because reflective element 100 may have essentially any structure, the details of such structures are not further described. Examples of preferred electrochromic mirror constructions are disclosed in U.S. Pat. No. 4,902,108, entitled "SINGLE-COMPARTMENT, SELF-ERASING, SOLUTION-PHASE ELECTROCHROMIC DEVICES SOLUTIONS FOR USE THEREIN, AND USES THEREOF," issued Feb. 20, 1990, to H. J. Byker; Canadian Patent No. 1,300,945, entitled "AUTOMATIC REARVIEW MIRROR SYSTEM FOR AUTOMOTIVE VEHICLES," issued May 19, 1992, to J. H. Bechtel et al.; U.S. Pat. No. 5,128,799, entitled "VARIABLE REFLECTANCE MOTOR VEHICLE MIRROR," issued Jul. 7, 1992, to H. J. Byker; U.S. Pat. No. 5,202,787, entitled "ELECTRO-OPTIC DEVICE," issued Apr. 13, 1993, to H. J. Byker et al.; U.S. Pat. No. 5,204,778, entitled "CONTROL SYSTEM FOR AUTOMATIC REARVIEW MIRRORS," issued Apr. 20, 1993, to J. H. Bechtel; U.S. Pat. No. 5,278,693, entitled "TINTED SOLUTION-PHASE ELECTROCHROMIC MIRRORS," issued Jan. 11, 1994, to D. A. Theiste et al.; U.S. Pat. No. 5,280,380, entitled "UV-STABILIZED COMPOSITIONS AND METHODS," issued Jan. 18, 1994, to H. J. Byker; U.S. Pat. No. 5,282,077, entitled "VARIABLE REFLECTANCE MIRROR," issued Jan. 25, 1994, to H. J. Byker; U.S. Pat. No. 5,294,376, entitled "BIPYRIDINIUM SALT SOLUTIONS," issued Mar. 15, 1994, to H. J. Byker; U.S. Pat. No. 5,336,448, entitled "ELECTROCHROMIC DEVICES WITH BIPYRIDINIUM SALT SOLUTIONS," issued Aug. 9, 1994, to H. J. Byker; U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; U.S. Pat. No. 5,451,822, entitled "ELECTRONIC CONTROL SYSTEM," issued Sep. 19, 1995, to J. H. Bechtel et al.; U.S. Pat. No. 5,818,625, entitled "ELECTROCHROMIC REARVIEW MIRROR INCORPORATING A THIRD SURFACE METAL REFLECTOR," by Jeffrey A. Forgette et al.; and U.S. patent application Ser. No. 09/158,423, entitled "IMPROVED SEAL FOR ELECTROCHROMIC DEVICES," filed on Sep. 21, 1998. Each of these patents and the patent application are commonly assigned with the present invention and the disclosures of each, including the references contained therein, are hereby incorporated herein in their entirety by reference.

If the mirror assembly includes a signal light, display, or other indicia behind the reflective electrode or reflective layer of reflective element 100, reflective element 100 is preferably constructed as disclosed in commonly assigned U.S. patent application Ser. No. 09/311,955, entitled "ELECTROCHROMIC REARVIEW MIRROR INCORPORATING A THIRD SURFACE METAL REFLECTOR AND A DISPLAY/SIGNAL LIGHT," filed on May 14, 1999, by W. L. Tonar et al., the disclosure of which is incorporated herein by reference. If reflective element 100 is convex or aspheric, as is common for passenger-side external rearview mirrors as well as external driver-side rearview mirrors of cars in Japan and Europe, reflective element 100 may be made using thinner elements 112 and 114 while using a polymer matrix in the chamber formed therebetween as is disclosed in commonly assigned U.S. Pat. No. 5,940,201 entitled "AN ELECTROCHROMIC MIRROR WITH TWO THIN GLASS ELEMENTS AND A GELLED ELECTROCHROMIC MEDIUM," filed on Apr. 2, 1997. The entire disclosure, including the references contained therein, of this U.S. patent is incorporated herein by reference. The addition of the combined reflector/electrode 120 onto third surface 114a of reflective element 100 further helps remove any residual double imaging resulting from the two glass elements being out of parallel.

The electrochromic element of the present invention is preferably color neutral. In a color neutral electrochromic element, the element darkens to a gray color, which is more ascetically pleasing than any other color when used in an electrochromic mirror. U.S. Pat. No. 6,020,987, entitled "ELECTROCHROMIC MEDIUM CAPABLE OF PRODUCING A PRE-SELECTED COLOR" discloses electrochromic media that are perceived to be gray throughout their normal range of operation. The entire disclosure of this patent is hereby incorporated herein by reference. U.S. patent application Ser. No. 09/311,955 entitled "ELECTROCHROMIC REARVIEW MIRROR INCORPORATING A THIRD SURFACE METAL REFLECTOR AND A DISPLAY/SIGNAL LIGHT" discloses additional electrochromic mirrors that exhibit substantial color neutrality while enabling displays to be positioned behind the reflective surface of the electrochromic mirror. The entire disclosure of this application is hereby incorporated herein by reference.

In addition to reflective element 100, mirror 20 further includes an optical coating 130. Optical coating 130 is a self-cleaning hydrophilic optical coating. Optical coating 130 preferably exhibits a reflectance at first surface 112a of reflective element 100 that is less than about 20 percent. If the reflectance at first surface 112a is greater than about 20 percent, noticeable double-imaging results, and the range of variable reflectance of reflective element 100 is significantly reduced. The variable reflectance mirror as a unit should have a reflectance of less than about 20 percent in its lowest reflectance state, and more preferably less than 15 percent, and most preferably less than 10 percent in most instances.

Optical coating 130 also is preferably sufficiently hydrophilic such that water droplets on a front surface of coating 130 exhibit a contact angle of less than about 30°, more preferably less than about 20°, and most preferably less than about 10°. If the contact angle is greater than about 30°, the coating 130 exhibits insufficient hydrophilic properties to prevent distracting water beads from forming. Optical coating 130 should also exhibit self-cleaning properties whereby the hydrophilic properties may be restored following exposure to UV radiation. As explained in further detail below, optical coating 130 should also have certain color characteristics so as to be color neutral or complement any coloration of the mirror element to render the mirror color neutral. For these purposes, coating 130 may include a color suppression coating 131 including one or more optical layers 132 and 134.

In one embodiment, optical coating 130 includes at least four layers of alternating high and low refractive index. Specifically, as shown in FIG. 2, optical coating 130 includes, in sequence, a first layer 132 having a high refractive index, a second layer 134 having a low refractive index, a third layer 136 having a high refractive index, and a fourth layer 138 having a low refractive index. Preferably, third layer 136 is made of a photocatalytic material, and fourth layer 138 is made of a material that will enhance the hydrophilic properties of the photocatalytic layer 136 by generating hydroxyl groups on its surface. Suitable hydrophilic enhancement materials include $SiO_2$ and $Al_2O_3$, with $SiO_2$ being most preferred. Suitable photocatalytic materials include $TiO_2$, ZnO, $ZnO_2$, $SnO_2$, ZnS, CdS, CdSe, $Nb_2O_5$, $KTaNbO_3$, $KTaO_3$, $SrTiO_3$, $WO_3$, $Bi2O_3$, $Fe2O_3$, and GaP, with $TiO_2$ being most preferred. By making the outermost layers $TiO_2$ and $SiO_2$, coating 130 exhibits good self-cleaning hydrophilic properties similar to those obtained by the prior art hydrophilic coatings applied to conventional mirrors having a reflector provided on the rear surface of a single front glass element. Preferably, the thickness of the $SiO_2$ outer layer is less than about 800 Å, more preferably less than 300 Å, and most preferably less than 150 Å. If the $SiO_2$ outer layer is too thick (e.g., more than about 1000 Å), the underlying photocatalytic layer will not be able to "clean" the $SiO_2$ hydrophilic outer layer, at least not within a short time period. In the first embodiment, the two additional layers (layers 132 and 134) are provided to reduce the undesirable reflectance levels at the front surface of reflective element 100 and to provide any necessary color compensation/suppression so as to provide the desired coloration of the mirror. Preferably, layer 132 is made of a photocatalytic material and second layer 134 is made of a hydrophilic enhancement material so as to contribute to the hydrophilic and photocatalytic properties of the coating. Thus, layer 132 may be made of any one of the photocatalytic materials described above or mixtures thereof, and layer 134 may be made of any of the hydrophilic enhancement materials described above or mixtures thereof. Preferably layer 132 is made of $TiO_2$ and layer 134 is made of $SiO_2$.

An alternative technique to using a high index layer and low index layer between the glass and the layer that is primarily comprised of photocatalytic metal oxide (i.e., layer 136) to obtain all of the desired properties while maintaining a minimum top layer thickness of primarily silica is to use a layer, or layers, of intermediate index. This layer(s) could be a single material such as tin oxide or a mixture of materials such as a blend of titania and silica. Among the materials that have been modeled as potentially useful are blends of titania and silica, which can be obtained through sol-gel deposition as well as other means, and tin oxide, indium tin oxide, and yttrium oxide. One can use a graded index between the glass and layer primarily composed of photocatalytic material as well.

Perhaps the most preferred mixed oxides used as a layer in the coating of the present invention would be titania blended with alumina, silica, tin oxide, or praseodymium oxide with titania comprising about 70 percent or greater of the oxide if the blended oxide is used for some or all of the photocatalytic layer. This allows for some generation of photocatalytic energy within the layer and transport of that energy through the layer.

Additionally, one can obtain roughly the same color and reflectance properties with a thinner top layer containing primarily silica or possibly no top layer if the index of the photocatalytic layer is lowered somewhat by blending materials, as would be the case, for example, for a titania and silica mixture deposited by sol-gel. The lower index of the titania and silica blend layer imparts less reflectivity, requires less compensation optically, and therefore allows for a thinner top layer. This thinner top layer should allow for more of the photocatalytic effect to reach surface contaminants.

As described below with respect to the second and third embodiments, color suppression coating 131 may also include a layer 150 of an electrically conductive transparent material such as ITO.

The index of refraction of a titania film obtained from a given coating system can vary substantially with the choice of coating conditions and could be chosen to give the lowest index possible while maintaining sufficient amounts of anatase or rutile form in the film and demonstrating adequate abrasion resistance and physical durability. The lower index obtained in this fashion would yield similar advantages to lowering the index by mixing titania with a lower index material. Ron Willey, in his book "Practical Design and Production of Optical Thin Films," Marcel Dekker, 1996, cites an experiment where temperature of the substrate, partial pressure of oxygen, and speed of deposition vary the index of refraction of the titania deposited from about n=2.1 to n=2.4.

Materials used for transparent second surface conductors are typically materials whose index of refraction is about 1.9 or greater and have their color minimized by using half wave thickness multiples or by using the thinnest layer possible for the application or by the use of one of several "non-iridescent glass structures." These non-iridescent structures will typically use either a high and low index layer under the high index conductive coating (see, for example, U.S. Pat. No. 4,377,613 and U.S. Pat. No. 4,419,386 by Roy Gordon), or an intermediate index layer (see U.S. Pat. No. 4,308,316 by Roy Gordon) or graded index layer (see U.S. Pat. No. 4,440,822 by Roy Gordon).

Fluorine doped tin oxide conductors using a non-iridescent structure are commercially available from Libbey-Owens-Ford and are used as the second surface transparent conductors in most inside automotive electrochromic mirrors produced at the present time. The dark state color of devices using this second surface coating stack is superior to that of elements using optical half wave thickness indium tin oxide (ITO) when it is used as a second surface conductive coating. Drawbacks of this non-iridescent coating are mentioned elsewhere in this document. Hydrophilic and photocatalytic coating stacks with less than about 800 Å silica top layer, such as 1000 Å titania 500 Å silica, would still impart unacceptable color and/or reflectivity when used as a first surface coating stack in conjunction with this non-iridescent second surface conductor and other non-iridescent second surface structures, per the previous paragraph, that are not designed to compensate for the color of hydrophilic coating stacks on the opposing surface. Techniques would still need to be applied per the present embodiment at the first surface to reduce C* of the system in the dark state if these coatings were used on the second surface.

ITO layers typically used as second surface conductors are either very thin (approximately 200–250 Å), which minimizes the optical effect of the material by making it as thin as possible while maintaining sheet resistances adequate for many display devices, or multiples of half wave optical thickness (about 1400 Å), which minimizes the overall reflectivity of the coating. In either case, the addition of photocatalytic hydrophilic coating stacks on opposing surfaces per the previous paragraph would create unacceptable color and/or reflectivity in conjunction with the use of these layer thicknesses of ITO used as the second surface conductor. Again, techniques would need to be applied per the present embodiment at the first surface to reduce the C* of the system in the dark state.

In somewhat analogous fashion, for modification of the first surface-coating stack to optimize the color and reflectivity of the system containing both first and second surface coatings, one can modify the second surface-coating stack to optimize the color of the system. One would do this by essentially creating a compensating color at the second surface in order to make reflectance of the system more uniform across the visible spectrum, while still maintaining relatively low overall reflectance. For example, the 1000 Å titania 500 Å silica stack discussed in several places within this document has a reddish-purple color due to having somewhat higher reflectance in both the violet and red portions of the spectrum than it has in the green. A second surface coating with green color, such as ¾ wave optical thickness ITO, will result in a lower C* value for the dark state system than a system with a more standard thickness of ITO of half wave optical thickness, which is not green in color. Additionally, one can modify thicknesses of layers or choose materials with somewhat different indices in the non-iridescent structures mentioned in order to create a compensating color second surface as well.

These second surface compensating color layers will add reflectance at relative reflectance minima in the first surface coating stack. If desired, these second surface coating stacks can add reflectance without a first surface coating present. For example, the three quarter wave optical thickness ITO layer mentioned above is at a relative maximum for reflectance and when used on the second surface will result in an element with higher dark state reflectivity than a similarly constructed element with half wave optical thickness ITO on the second surface whether or not additional first surface coatings are present.

Another method of color compensating the first surface is through pre-selecting the color of the electrochromic medium in the dark state in accordance with the teachings of commonly assigned U.S. Pat. No. 6,020,987, entitled "ELECTROCHROMIC MEDIUM CAPABLE OF PRO-DUCING A PRE-SELECTED COLOR." Again, by using first surface coatings of 1000 Å titania followed by 500 Å silica as an example, the following modification would assist in lowering the C* value of an electrochromic mirror when activated. If, in that case, the color of the electrochromic medium was selected so that it was less absorbing in the green region when activated, the higher reflection of green wavelengths of light from the third or fourth surface reflector of the element would help balance the reflection of the unit in the dark state.

Combinations of the aforementioned concepts for the first, second surface, and electrochromic medium are also potentially advantageous for the design.

At times, especially on convex or aspheric mirrors, it may be desirable to limit the low end reflectance of an electro-optic mirror to about 12 percent or greater to compensate for the reduced brightness of images reflected off of the convex or aspheric surface. Maintaining a tight tolerance on this increased low-end reflectance value is difficult to achieve by controlling the full dark absorption of the electro-optic media alone, which is accomplished by either reducing the applied voltage or altering the concentration of the electro-optic materials in the electro-optic medium. It is much more preferred to maintain and control the tolerance on this increased low-end reflectance with a first surface film that would have a higher refractive index and therefore higher first surface reflectance than glass alone. Maintaining uniformity of the increased low-end reflectance from batch to batch in manufacturing is much easier with a first surface film than with the electro-optic media. As noted above, photocatalytic layers, such as titanium dioxide have such a higher refractive index. The dark state reflectivity can be raised using first surface coatings that are non-photocatalytic in nature as well. For example, by using quarter wave optical thickness aluminum oxide as the only layer on the first surface, the dark state reflectance of an element can be raised by approximately three to four percent.

It is known that the optical properties for a deposited film vary depending on deposition conditions that include partial pressure of oxygen gas, temperature of the substrate speed of deposition, and the like. In particular, the index of refraction for a particular set of parameters on a particular system will affect the optimum layer thicknesses for obtaining the optical properties being discussed.

The discussions regarding the photocatalytic and hydrophilic properties of titania and like photocatalytic materials and silica and like hydrophilic materials are generally applicable to layers of mixed materials as long as the mixtures retain the basic properties of photocatalytic activity and/or hydrophilicity. Abrasion resistance is also a major consideration in the outermost layer. EP 0816466A1 describes an abrasion resistant, photocatalytic, hydrophilic layer of silica blended titania, as well as a layer of tin oxide blended titania with similar properties. U.S. Pat. No. 5,755,867 describes photocatalytic blends of silica and titania obtained through use of these mixtures. These coatings would likely require modifications to change their optical properties suitable for use on an electrochromic device. The potential advantages of these optical property modifications to this invention are discussed further below.

In some variations of this invention, it may be preferable to include a layer of material between the substrate, especially if it is soda lime glass, and the photocatalytic layer(s) to serve as a barrier against sodium leaching in particular. If this layer is close to the index of refraction of the substrate, such as silica on soda lime glass, it will not affect the optical properties of the system greatly and should not be considered as circumventing the spirit of the invention with regards to contrasting optical properties between layers.

To expedite the evaporation of water on the mirror and prevent the freezing of thin films of water on the mirror, a heating element 122 may optionally be provided on the fourth surface 114b of reflective element 100. Alternatively, as described below, one of the transparent front surface films could be formed of an electrically conductive material and hence function as a heater.

Figure 3:
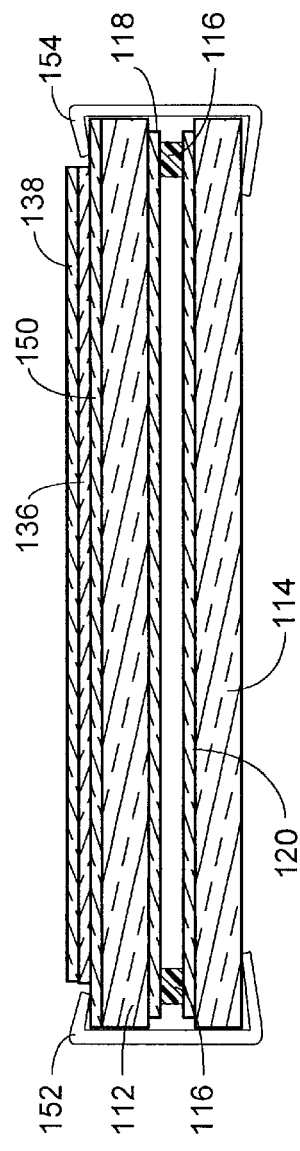
FIG. 3 is a cross section of a second embodiment of the external rearview mirror assembly shown in FIG. 1 along line 3–3'.

A second embodiment of the invention is shown in FIG. 3. As illustrated, electrochromic mirror 100 has a similar construction to that shown in FIG. 2. Optical coating 130, however, differs in that it includes a transparent electrically conductive coating 150 that underlies hydrophilic layer 136. Suitable transparent conductors include ITO, ZnO, and $SnO_2$ (fluorine doped). Because each of these transparent conductors has a refractive index between that of the glass (1.45) of element 112 and the $TiO_2$ (~2.3) of layer 136, they make an excellent optical sublayer by reducing color and reflectivity as a result of applying the hydrophilic layer 136.

An additional advantage resulting from the use of a transparent conductor 150 on the front surface of mirror element 100 is that an electric current may be passed through layer 150 such that layer 150 functions as a heater. Because hydrophilic coatings tend to spread water out into a thin film over the surface of the mirror, the water tends to freeze more quickly and impair vision. Thus, transparent conductive layer 150 can double both as a heater and a color/reflection suppression layer.

The provision of a heater layer 150 on the front surface of the mirror provides several advantages. First, it removes the need to provide a costly heater to the back of the mirror. Additionally, heater 150 provides heat at the front surface of the mirror where the heat is needed most to clear the mirror of frost. Current heaters applied to the back of the mirror must heat through the whole mirror mass to reach the frost film on the front surface.

To apply a voltage across layer 150, a pair of buss clips 152 and 154 may be secured at the top and bottom of mirror 100 or on opposite sides so as to not interfere with the buss clips that are otherwise used to apply a voltage across electrochromic medium 124 via conductors 118 and 120.

Figure 4:
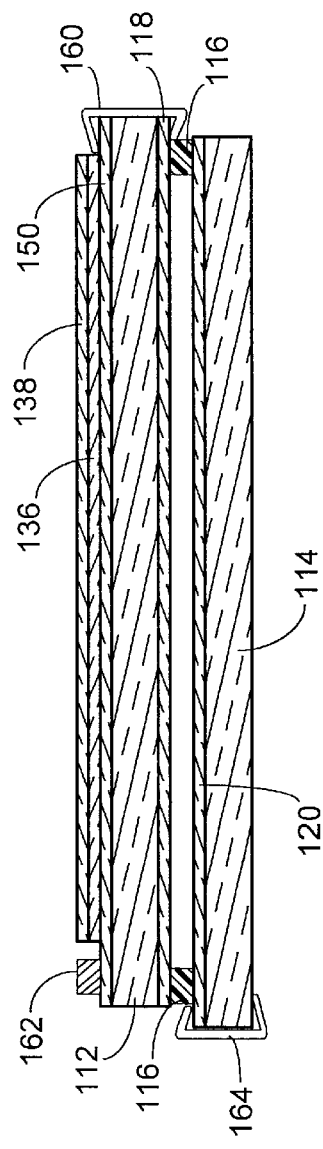
FIG. 4 is a cross section of a third embodiment of the external rearview mirror assembly shown in FIG. 1 along line 4–4'.

Alternatively, as shown in FIG. 4, a common buss clip 160 may be provided to electrically couple electrode 118 and one edge of heater layer 150 to ground while separate electrical buss connections 162 and 164 are provided to respectively couple the other side of heater layer 150 and electrode 120 to a positive voltage potential.

To illustrate the properties and advantages of the present invention, examples are provided below. The following illustrative examples are not intended to limit the scope of the present invention but to illustrate its application and use. In these examples, references are made to the spectral properties of an electrochromic mirror constructed in accordance with the parameters specified in the example. In discussing colors, it is useful to refer to the Commission Internationale de l'Eclairage's (CIE) 1976 CIELAB Chromaticity Diagram (commonly referred to as the L*a*b* chart) as well as tristimulus values x, y, or z. The technology of color is relatively complex, but a fairly comprehensive discussion is given by F. W. Billmeyer and M. Saltzman in *Principles of Color Technology*, 2nd Edition, J. Wiley and Sons Inc. (1981), and the present disclosure, as it relates to color technology and terminology, generally follows that discussion. On the L*a*b* chart, L* defines lightness, a* denotes the red/green value, and b* denotes the yellow/blue value. Each of the electrochromic media has an absorption spectra at each particular voltage that may be converted to a three-number designation, their L*a*b* values. To calculate a set of color coordinates, such as L*a*b* values, from the spectral transmission or reflectance, two additional items are required. One is the spectral power distribution of the source or illuminant. The present disclosure uses CIE Standard Illuminant $D_{65}$. The second item needed is the spectral response of the observer. The present disclosure uses the 2-degree CIE standard observer. The illuminant/observer combination used is represented as $D_{65}$/2 degree. Many of the examples below refer to a value Y from the 1931 CIE Standard since it corresponds more closely to the reflectance than L*. The value C*, which is also described below, is equal to the square root of $(a^*)^2+(b^*)^2$, and hence, provides a measure for quantifying color neutrality. To obtain an electrochromic mirror having relative color neutrality, the C* value of the mirror should be less than 25. Preferably, the C* value is less than 20, more preferably is less than 15, and even more preferably is less than about 10.

EXAMPLE 1

Two identical electrochromic mirrors were constructed having a rear element made with 2.2 mm thick glass with a layer of chrome applied to the front surface of the rear element and a layer of rhodium applied on top of the layer of chrome using vacuum deposition. Both mirrors included a front transparent element made of 1.1 mm thick glass, which was coated on its rear surface with a transparent conductive ITO coating of ½ wave optical thickness. The front surfaces of the front transparent elements were covered by a coating that included a first layer of 200 Å thick $TiO_2$, a second layer of 250 Å thick $SiO_2$, a third layer of 1000 Å $TiO_2$, and a fourth layer of 500 Å thick $SiO_2$. For each mirror, an epoxy seal was laid about the perimeter of the two coated glass substrates except for a small port used to vacuum fill the cell with electrochromic solution. The seal had a thickness of about 137 microns maintained by glass spacer beads. The elements were filled with an electrochromic solution including propylene carbonate containing 3 percent by weight polymethylmethacrylate, 30 Mm Tinuvin P (UV absorber), 38 Mm N,N'-dioctyl-4, 4'bipyridinium bis(tetrafluoroborate), 27 Mm 5,10-dihydrodimethylphenazine and the ports were then plugged with a UV curable adhesive. Electrical contact buss clips were electrically coupled to the transparent conductors.

In the high reflectance state (with no potential applied to the contact buss clips), the electrochromic mirrors had the following averaged values: L*=78.26, a*=−2.96, b*=4.25, C*=5.18, and Y=53.7. In the lowest reflectance state (with a potential of 1.2 V applied), the electrochromic mirrors had the following averaged values: L*=36.86, a*=6.59, b*=−3.51, C*=7.5, and Y=9.46. The average contact angle that a drop of water formed on the surfaces of the electrochromic mirrors after it was cleaned was 7°.

For purposes of comparison, two similar electrochromic mirrors were constructed, but without any first surface coating. These two mirrors had identical construction. In the high reflectance state, the electrochromic mirrors had the following averaged values: L*=78.93, a*=−2.37, b*=2.55, C*=3.48, and Y=54.81. In the lowest reflectance state, the electrochromic mirrors had the following averaged values: L*=29.46, a*=0.55, b*=−16.28, C*=16.29, and Y=6.02. As this comparison shows, the electrochromic mirrors having the inventive hydrophilic coating unexpectedly and surprisingly had better color neutrality than similarly constructed electrochromic mirrors not having such a hydrophilic coating. Additionally, the comparison shows that the addition of the hydrophilic coating does not appreciably increase the low-end reflectance of the mirrors.

EXAMPLE 2

An electrochromic mirror was constructed in accordance with the description of Example 1 with the exception that a different first surface coating stack was deposited. The first surface stack consisted of a first layer of ITO having a thickness of approximately 700 Å, a second layer of $TiO_2$ having thickness of 2400 Å, and a third layer of $SiO_2$ having a thickness of approximately 100 Å. The physical thickness of the ITO layer corresponds to approximately ¼ wave optical thickness at 500 nm and the physical thickness of the $TiO_2$ layer corresponds to approximately 1 wave optical thickness at 550 nm. The proportion of anatase titania to rutile titania in the $TiO_2$ layer was determined to be about 89 percent anatase form and 11 percent rutile form from X-ray diffraction analysis of a similar piece taken from glass run in the same timeframe under similar coating parameters.

In the high reflectance state, the electrochromic mirror had the following averaged values: L*=80.37, a*=−2.49, b*=3.22, C*=4.07, and Y=57.35. In the lowest reflectance state (with a potential of 1.2 V applied), the electrochromic mirror had the following averaged values: L*=48.46, a*=−6.23, b*=−4.64, C*=7.77, and Y=17.16. The contact angle of a water droplet on the surface of this electrochromic mirror after cleaning was 4°. This example illustrates the suitability of an ITO color suppression layer 150 underlying the hydrophilic layers 136 and 138.

EXAMPLE 3

An electrochromic mirror was modeled using commercially available thin film modeling software. In this example, the modeling software was FILMSTAR available from FTG Software Associates, Princeton, New Jersey. The electrochromic mirror that was modeled had the same constructions as in Examples 1 and 2 above except for the construction of the optical coating applied to the front surface of the mirror. Additionally, the mirror was only modeled in a dark state assuming the completely absorbing electrochromic fluid of index 1.43. The optical coating stack consisted of a first layer of $SnO_2$ having a thickness of 720 Å and a refractive index of 1.90 at 550 nm, a second layer of dense $TiO_2$ having a thickness of 1552 Å and a refractive index of about 2.43 at 550 nm, a third layer of a material with an index of about 2.31 at 550 nm and a wavelength-dependent refractive index similar to $TiO_2$ applied at a thickness of 538 Å, and a fourth layer of $SiO_2$ having a refractive index of 1.46 at 550 nm and a thickness of 100 Å. The electrochromic mirror had the following averaged values: L*=43.34, a*=8.84, b*=12.86, C*32 15.2, and Y=13.38.

The material with an index of 2.31 constituting the third layer may be attained in several ways, including the following which could be used in combination or singularly: (1) reducing the density of the titania in the layer, (2) changing the ratio of anatase to rutile titania in the layer, and/or (3) creating a mixed oxide of titania and at least one other metal oxide with lower refractive index, such as $Al_2O_3$, $SiO_2$ or $SnO_2$ among others. It should be noted that the electrochromic materials used in Examples 1 and 2 above do not become a perfectly absorbing layer upon application of voltage, and therefore, the model based on a completely absorbing electrochromic layer will tend to be slightly lower in predicted luminous reflectance Y than the actual device.

EXAMPLE 4

An electrochromic mirror was modeled having the exact same parameters as in Example 3, but replacing the 1552 Å—thick second layer of $TiO_2$ of index 2.43 at 550 nm and the 538 Å—thick third layer of index 2.31 at 550 nm, with a single layer of 2100 Å—thick material having a refractive index of 2.31 at 550 nm. The electrochromic mirror so modeled had the following predicted averaged values: L*=43.34, a*=0.53, b*=−6.21, C*=6.23, and Y=15.41.

In comparing Examples 3 and 4, it will be noted that the layers of index 2.43 and 2.31 in Example 3 yield a unit with lower Y than an equal thickness of material with refractive index of 2.31 in the same stack. Nevertheless, the color neutrality value C* is lower in the fourth example.

EXAMPLE 5

An electrochromic mirror was modeled using the same parameters as in Example 3, but with the following first surface coating stack: a first layer of $Ta_2O_5$ having a thickness of 161 Å and a refractive index of about 2.13 at 550 nm; a second layer of $Al_2O_3$ having a thickness of 442 Å and a refractive index of about 1.67 at 550 nm; a third layer of $TiO_2$ having a thickness of 541 Å and a refractive index of about 2.43 at 550 nm; a fourth layer of $TiO_2$ or $TiO_2$ mixed with another oxide and having a thickness of 554 Å and a refractive index of about 2.31 at 550 nm; and a fifth layer of $SiO_2$ having a thickness of 100 Å and a refractive index of about 1.46 at 550 nm. This electrochromic mirror had the following averaged values predicted by the modeling software: L*=39.01, a*=9.39, b*=−10.14, C*=13.82, and Y=10.66.

EXAMPLE 6

An electrochromic mirror was constructed in the same manner as described above with respect to Example 1 except that a different first surface coating stack was deposited. This first surface stack consisted of a first layer of $TiO_2$ having a thickness of approximately 1000 Å and a second layer of $SiO_2$ having a thickness of 200 Å.

In a high reflectance state, the following averaged values were measured: L*=79.47, a*=−0.34, b*=2.10, C*=2.13, and Y=55.74. In the lowest reflectance state (with a potential of 1.2 V applied), the electrochromic mirror had the following averaged values: L*=36.21, a*=−28.02, b*=−17.94, C*=33.27, and Y=9.12.

The present invention thus provides a hydrophilic coating that not only is suitable for an electrochromic device, but actually improves the color neutrality of the device.

To demonstrate the self-cleaning photocatalytic properties of the inventive hydrophilic coatings, four different samples were made and the initial contact angle of a drop of water on the surface of the coating was measured. Subsequently, a thin layer of 75W90 gear oil was applied across the surface of these coatings with the excess oil removed by wiping with a solvent-free cloth. The contact angle of a water drop on the surface was then measured. The samples were then placed under UV light (1 mW/m$^2$) for the remainder of the test. The first sample had a single layer of $TiO_2$ having a thickness of 1200 Å. The second sample had a single layer of $TiO_2$ at a thickness of 2400 Å. The third sample included a bottom layer of ITO having a thickness of 700 Å, a middle layer of $TiO_2$ having a thickness of 2400 Å, and a top layer of $SiO_2$ having a thickness of 100 Å. The fourth sample had a bottom layer of $TiO_2$ having a thickness of 2400 Å and a top layer of SiO$_2$ having a thickness of 300 Å. These samples were all produced via sputter deposition on the same day. In sample 3, however, the ITO was pre-deposited. X-ray diffraction analysis showed a crystal structure of the TiO$_2$ layer as including 74 percent anatase TiO$_2$ and 26 percent rutile TiO$_2$. All samples were formed on soda lime glass substrates. The results of the test are illustrated below in Table 1.

rapidly at high glass bending temperatures. A sol-gel formed silica or doped silica layer, for instance phosphorous doped silica, is effective in reducing sodium migration. This barrier underlayer can be applied using a sol-gel process. This silica layer could be applied first to the base glass or incorporated into the hydrophilic stack between the photocatalytic layer and the glass.

TABLE 1

| Sample (Bottom/Middle/Top) | Initial | 1 | 2 | 3 | 4 | 7 | 8 | 9 | 10 | 11 | 14 | 15 | 17 |
|---|---|---|---|---|---|---|---|---|---|---|---|---|---|
| | | | | | | Contact Angle of Water | | | | | | | |
| 1200 Å TiO$_2$ | 3 | 59 | 60 | 50 | 49 | 55 | 26 | 16 | 18 | 18 | 7 | 6 | 6 |
| 2400 Å TiO$_2$ | 3 | 52 | 45 | 38 | 39 | 11 | 10 | 11 | 10 | 10 | 4 | 6 | 6 |
| 700 Å ITO/2400 Å TiO$_2$/100 Å SiO$_2$ | 2 | 63 | 59 | 39 | 38 | 34 | 23 | 24 | 25 | 21 | 7 | 8 | 9 |
| 2400 Å TiO$_2$/300 Å SiO$_2$ | 5 | 62 | 59 | 43 | 38 | 39 | 36 | 41 | 40 | 40 | 30 | 24 | 13 |

As apparent from Table 1, any top layer of SiO$_2$ should be kept relatively thin to allow the photocatalytic effect of the underlying TiO$_2$ layer to be effective. It is also apparent that increasing the thickness of the TiO$_2$ layer increases the photocatalytic rate.

Although the examples cited above uses a vacuum deposition technique to apply the coating, these coatings can also be applied by conventional sol-gel techniques. In this approach, the glass is coated with a metal alkoxide made from precursors such as tetra isopropyl titanate, tetra ethyl ortho silicate, or the like. These metal alkoxides can be blended or mixed in various proportions and coated onto glass usually from an alcohol solution after being partially hydrolyzed and condensed to increase the molecular weight by forming metal oxygen metal bonds. These coating solutions of metal alkoxides can be applied to glass substrates by a number of means such as dip coating, spin coating, or spray coating. These coatings are then fired to convert the metal alkoxide to a metal oxide typically at temperatures above 450° C. Very uniform and durable thin film can be formed using this method. Since a vacuum process is not involved, these films are relatively inexpensive to produce. Multiple films with different compositions can be built up prior to firing by coating and drying between applications. This approach can be very useful to produce inexpensive hydrophilic coatings on glass for mirrors, especially convex or aspheric mirrors that are made from bent glass. In order to bend the glass, the glass must be heated to temperatures above 550° C. If the sol-gel coatings are applied to the flat glass substrate before bending (typically on what will be the convex surface of the finished mirror), the coatings will fire to a durable metal oxide during the bending process. Thus, a hydrophilic coating can be applied to bent glass substrates for little additional cost. Since the majority of outside mirrors used in the world today are made from bent glass, this approach has major cost benefits. It should be noted that some or all of the coatings could be applied by this sol-gel process with the remainder of the coating(s) applied by a vacuum process, such as sputtering or E-beam deposition. For example, the first high index layer and low index layer of, for instance, TiO$_2$ and SiO$_2$, could be applied by a sol-gel technique and then the top TiO$_2$ and SiO$_2$ layer applied by sputtering. This would simplify the requirements of the coating equipment and yield cost savings. It is desirable to prevent migration of ions, such as sodium, from soda lime glass substrates into the photocatalytic layer. The sodium ion migration rate is temperature dependent and occurs more In general, the present invention is applicable to any electrochromic element including architectural windows and skylights, automobile windows, rearview mirrors, and sunroofs. With respect to rearview mirrors, the present invention is primarily intended for outside mirrors due to the increased likelihood that they will become foggy or covered with mist. Inside and outside rearview mirrors may be slightly different in configuration. For example, the shape of the front glass element of an inside mirror is generally longer and narrower than outside mirrors. There are also some different performance standards placed on an inside mirror compared with outside mirrors. For example, an inside mirror generally, when fully cleared, should have a reflectance value of about 70 percent to about 85 percent or higher, whereas the outside mirrors often have a reflectance of about 50 percent to about 65 percent. Also, in the United States (as supplied by the automobile manufacturers), the passenger-side mirror typically has a non-planar spherically bent or convex shape, whereas the driver-side mirror 111$a$ and inside mirror 110 presently must be flat. In Europe, the driver-side mirror 111$a$ is commonly flat or aspheric, whereas the passenger-side mirror 111$b$ has a convex shape. In Japan, both outside mirrors have a non-planar convex shape.

The fact that outside rearview mirrors are often non-planar raises additional limitations on their design. For example, the transparent conductive layer applied to the rear surface of a non-planar front element is typically not made of fluorine-doped tin oxide, which is commonly used in planar mirrors, because the tin oxide coating can complicate the bending process and it is not commercially available on glass thinner than 2.3 mm. Thus, such bent mirrors typically utilize a layer of ITO as the front transparent conductor. ITO, however, is slightly colored and adversely introduces blue coloration into the reflected image as viewed by the driver. The color introduced by an ITO layer applied to the second surface of the element may be neutralized by utilizing an optical coating on the first surface of the electrochromic element. To illustrate this effect, a glass element coated with a half wave thick ITO layer was constructed as was a glass element coated with a half wave thick ITO layer on one side and the hydrophilic coating described in the above Example 1 on the other side. The ITO-coated glass without the hydrophilic coating had the following properties: L*=37.09, a*=8.52, b*=−21.12, C*=22.82, and a first/second surface spectral reflectance of Y=9.58. By contrast, the ITO-coated glass that included the inventive hydrophilic coating of the above-described example exhibited the following properties: L*=42.02, a*=2.34, b*=−8.12, C*=8.51, and a first/second surface spectral reflectance of Y=12.51. As evidenced by the significantly reduced C* value, the hydrophilic coating serves as a color suppression coating by noticeably improving the coloration of a glass element coated with ITO. Because outside rearview mirrors are often bent and include ITO as a transparent conductor, the ability to improve the color of the front coated element by adding a color suppression coating to the opposite side of the bent glass provides many manufacturing advantages.

The first transparent electrode 118 coating can also be rendered more color neutral by incorporating thicker layers of first high then low refractive index of the appropriate thicknesses or an underlayer with an intermediate refractive index of the appropriate thickness. For example, half wave and full wave ITO films can be made more color neutral by a one-quarter wave underlayer of intermediate refractive index aluminum oxide ($Al_2O_3$). Table 2 below lists the measured reflected color values of one-half and full wave ITO films with and without a one-quarter wave thick underlayer of $Al_2O_3$ on glass. Both films were applied to the glass substrate by reactive magnetron sputtering.

TABLE 2

|    | Full wave ITO | Full wave ITO with 1/4 wave $Al_2O_3$ (894 Å) | 1/2 Wave ITO | 1/2 Wave ITO with 1/4 wave $Al_2O_3$ (856 Å) |
|----|---------------|-----------------------------------------------|--------------|----------------------------------------------|
| L* | 40.67         | 41.52                                         | 37.25        | 40.26                                        |
| a* | 16.01         | 6.68                                          | 10.18        | 1.66                                         |
| b* | −11.53        | −8.36                                         | −6.16        | −4.66                                        |
| Y  | 11.66         | 12.2                                          | 9.67         | 11.41                                        |

Other light attenuating devices, such as scattered particle displays (such as those discussed in U.S. Pat. Nos. 5,650,872, 5,325,220, 4,131,334, and 4,078,856) or liquid crystal displays (such as those discussed in U.S. Pat. Nos. 5,673,150, 4,878,743, 4,813,768, 4,693,558, 4,671,615, and 4,660,937), can also benefit from the application of these principles. In devices where the light attenuating layer is between two pieces of glass or plastic, the same basic constraints and solutions to those constraints will apply. The color and reflectivity of a first surface hydrophilic layer or layer stack can impart substantial color and reflectivity to the device in the darkened state even when this first surface layer stack does not appreciably affect the bright state characteristics. Adjustments to the first surface layer stack similar to those discussed for an electrochromic device will, therefore, affect the color and/or reflectivity of the darkened device advantageously. The same will apply to adjustments made to the second surface of the device or to the color of the darkening layer itself.

Figure 5:
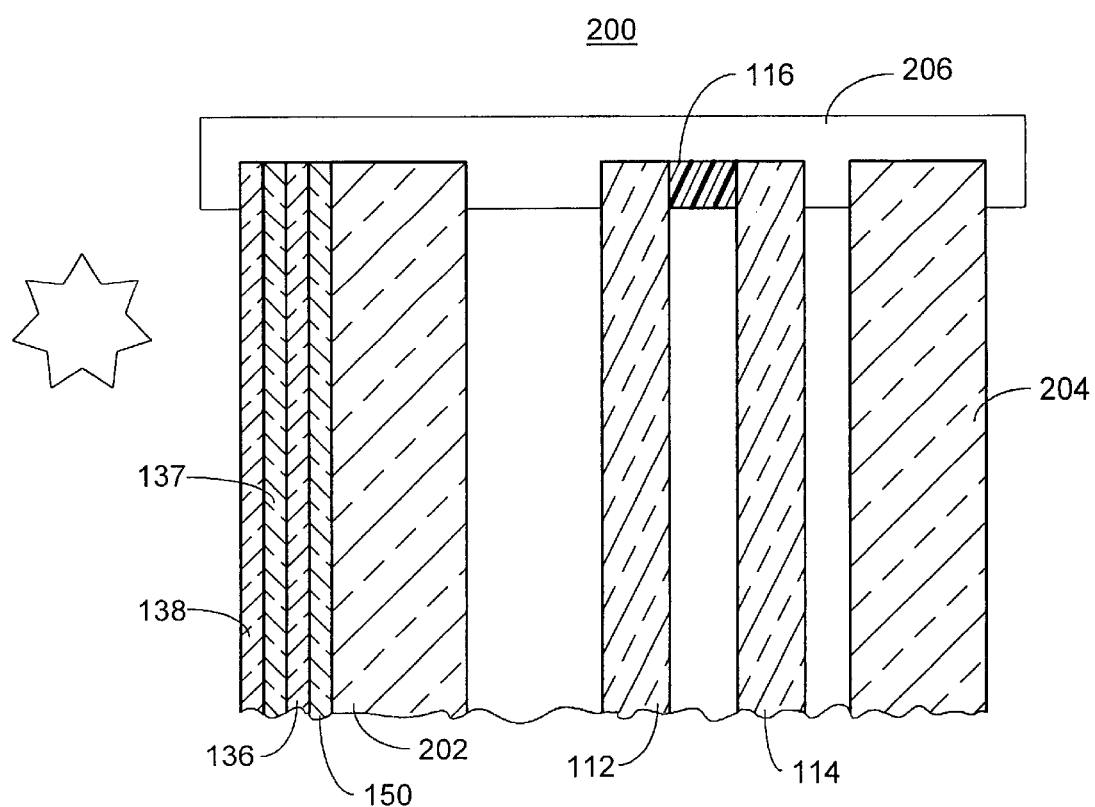
FIG. 5 is a partial cross section of an electrochromic insulated window constructed in accordance with the present invention.

These principles can also be applied to devices such as variable transmittance insulated windows. FIG. 5 shows an example of a variable transmittance window 200. As illustrated, the window includes an inner glass pane or other transparent element 204, an outer glass pane or other transparent element 202, and a window frame 206 that holds glass panes 202 and 204 in parallel spaced-apart relation. A variable transmittance element is positioned between glass panes 202 and 204 and may take the form of an electrochromic mirror with the exception that the reflective layer of the mirror is removed. Thus, the element may include a pair of spaced-apart transparent substrates 112 and 114 joined together by a seal 116 to define a chamber in which an electrochromic medium is dispensed. It will be appreciated by those skilled in the art that the structure of window 200 is shown for purposes of example only and that the frame and relation of the components to one another may vary.

As shown in FIG. 5, outer pane 202 may have an optical coating disposed on its outer surface. Specifically, this coating may include a first layer 150 having a refractive index intermediate that of glass pane 202 and a second layer 136 made of a photocatalytic material, such as titanium dioxide. A third layer 137 may optionally be disposed over layer 136 and may comprise a photocatalytic material such as titanium dioxide. Preferably, as indicated above, such a layer would be modified to have a lower refractive index than layer 136. The coating may further include an optional hydrophilic layer 138 made of a material such as $SiO_2$. In general, any of the hydrophilic coatings discussed above may be utilized. It should be noted that color suppression and obtaining a neutral color of the window as a whole may or may not be a design constraint. Specifically, some windows are intentionally tinted a particular color for architectural purposes. In such a case, any color suppression layer may be selected so as to enhance a particular color.

In optimizing the layer materials and layer thicknesses for optical and photocatalytic effects, it should be noted that increasing the thickness of the high index functional coating increases the strength of the photocatalytic effect. This is evidenced by a comparison of samples 1 and 2 in Table 1 above. The use of dopants may also increase photocatalytic activity and possibly allow the thickness of the layer to otherwise be decreased while maintaining a particular level of photocatalism. Such dopants may include platinum, group metals copper, nickel, lanthanum, cobalt, and $SnO_2$. In general, a lower index of refraction for the outermost layer is desirable to reduce the reflectivity of the coating. This can be accomplished by lowering the density of the outermost layer, however, this may decrease the scratch resistance. Also, the $TiO_2$ layer may be blended with silica, alumina, tin oxide, zinc oxide, zirconia, and praseodymium oxide to lower the index of that layer. In designs such as that described in Example 3, it may be possible to keep the majority of the material having the intermediate refractive index (i.e., the $SnO_2$ layer) or blending with another material having some photocatalytic activity and thereby increase the photocatalytic activity of the entire stack. For example, $SnO_2$ may be used alone or in a mixture with another oxide.

As noted above, the thicker the $SiO_2$ top layer, the easier it is to attain relatively low C* and Y, but there may be a substantial and undesirable insulative effect with respect to the photocatalism of the stack when the $SiO_2$ top layer is too thick.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An electrochromic mirror, comprising:

first and second substrates each having front and rear surfaces spaced apart and sealed to provide a chamber therebetween, the front surface of said first substrate having a self-cleaning hydrophilic coating associated therewith;

a first electrode disposed on the rear surface of said first substrate;

a color suppressing layer disposed on a surface of said first substrate, said color suppressing layer having a refractive index intermediate one of said first electrode or said self-cleaning hydrophilic coating and said first substrate, wherein said color suppressing layer reduces the color of the electrochromic mirror in an activated state;

a reflector disposed on one of said front or rear surfaces of said second substrate such that when said reflector is on said rear surface of said second substrate, then said front surface of said rear substrate contains a layer of a transparent conductive material; and an electrochromic medium disposed in the chamber.

2. The electrochromic medium as defined in claim 1, wherein said first electrode is made of indium tin oxide.

3. The electrochromic medium as defined in claim 1, wherein said first electrode has a half wave optical thickness.

4. The electrochromic medium as defined in claim 1, wherein said first electrode has a full wave optical thickness.

5. The electrochromic medium as defined in claim 1, wherein said color suppressing layer has a quarter wave optical thickness.

6. The electrochromic medium as defined in claim 1, wherein said color suppressing layer comprises $Al_2O_3$.

7. The electrochromic medium as defined in claim 1, wherein said electrochromic medium comprises a color such that, when combined with said first substrate, said self-cleaning hydrophilic coating, and said color suppressing layer, the C* value of said electrochromic mirror in an activated state decreases relative to the same without said color-suppressing layer.

* * * * *